United States Patent
Sacks et al.

(10) Patent No.: US 6,181,505 B1
(45) Date of Patent: Jan. 30, 2001

(54) SYNCHRONOUS DIGITAL DEMODULATOR WITH INTEGRATED READ AND SERVO CHANNELS

(75) Inventors: Alexei H. Sacks, St. Louis Park; Timothy F. Ellis, Tonka Bay, both of MN (US)

(73) Assignee: Seagate Technology LLC, Scotts Valley, CA (US)

( * ) Notice: Under 35 U.S.C. 154(b), the term of this patent shall be extended for 0 days.

(21) Appl. No.: 09/268,009

(22) Filed: Mar. 15, 1999

Related U.S. Application Data (60) Provisional application No. 60/090,776, filed on Jun. 26, 1998.

(51) Int. Cl.[7] ..................................................... G11B 5/596
(52) U.S. Cl. ........................... 360/77.08; 360/29; 360/51; 360/78.14
(58) Field of Search ................................ 360/51, 29, 75, 360/77.01, 77.02, 77.08, 78.04, 78.14

(56) References Cited

U.S. PATENT DOCUMENTS

| | | | |
|---|---|---|---|
| 4,678,103 | 7/1987 | Workman | 360/77 |
| 4,954,907 | 9/1990 | Takita | 360/78.07 |
| 5,089,757 | 2/1992 | Wilson | 318/560 |
| 5,136,439 | 8/1992 | Weispfenning et al. | 360/77.08 |
| 5,345,342 | 9/1994 | Abbott et al. | 360/48 |
| 5,576,906 | 11/1996 | Fisher et al. | 360/77.08 |
| 5,602,692 | 2/1997 | Freitas et al. | 360/77.08 |
| 5,668,678 | 9/1997 | Reed et al. | 360/51 |
| 5,825,579 | 10/1998 | Cheung et al. | 360/77.08 |
| 5,838,512 | * 11/1998 | Okazaki | 360/51 |

FOREIGN PATENT DOCUMENTS

| | | |
|---|---|---|
| 0 262 690 A2 | 5/1983 | (EP) . |
| 0 420 439 A1 | 9/1990 | (EP) . |
| 0 798 704 A1 | 3/1997 | (EP) . |
| 0 828 242 A1 | 3/1998 | (EP) . |
| 9-091886 | 4/1997 | (JP) . |
| WO 97/28529 | 8/1997 | (WO) . |

OTHER PUBLICATIONS

Tuttle, G.T. et al., "A 130MB/S PRML Read/Write Chanel with Digital–Servo Detection", IEEE International Solid State Circuits Conference, vol. 39, Feb. 1, 1996, p. 64, 65, 419.

Reed, D.E. et al., "Digital Servo Demodulation in a Digital Read Channel", 8th Annual Magnetic Recording Conference on Magnetic Recording Systems, Sep. 8–10, 1997, pp. 13–16.

Abramovitch, D.Y., "Customizable Coherent Servo Demodulation for Disk Drives", Proceedings of the 1998 American Control Conference, vol. 5, Jun. 24–26, 1998, pp. 3043–3049.

* cited by examiner

Primary Examiner—Andrew L. Sniezek
(74) Attorney, Agent, or Firm—Westman, Champlin & Kelly, P.A.

(57) ABSTRACT

A synchronous digital demodulator and method for demodulating a read signal including a user data waveform and a servo waveform which are generated by a read head as the read head passes over a user data area and a servo area, respectively, on a medium in a storage device. The user data waveform is converted to a series of digital user data values at a user data sample rate. The series of digital user data values are then applied to a user data detector circuit. The servo waveform is converted to a series of digital servo values at a servo sample rate, which is independent from the user data sample rate. The series of digital servo values are demodulated synchronously with the servo waveform to produce a position error value indicative of a position error of the read head relative to a location on the medium.

17 Claims, 7 Drawing Sheets

SYNCHRONOUS DIGITAL DEMODULATOR WITH INTEGRATED READ AND SERVO CHANNELS

CROSS-REFERENCE TO RELATED APPLICATION

This application claims the benefit of U.S. Provisional Patent Application No. 60/090,776, entitled "SYNCHRONOUS DIGITAL DEMODULATION TECHNIQUES FOR A NULL TYPE SERVO PATTERN," filed Jun. 26, 1998.

Cross-reference is also made to a U.S. Application filed on even date herewith and entitled "ASYNCHRONOUS DIGITAL DEMODULATOR AND METHOD FOR A NULL-TYPE SERVO PATTERN," which claims priorty from U.S. Provisional Patent Application No. 60/086,279 entitled "ASYNCHRONOUS DIGITAL DEMODULATION TECHNIQUE FOR A NULL TYPE SERVO PATTERN," filed May 21, 1998, a U.S. Application filed on even date herewith and entitled METHOD AND APPARATUS UTILIZING FIELD RATIOING DEMODULATION TECHNIQUES FOR A NULL TYPE SERVO PATTERN," which claims priority from U.S. Provisional Patent Application No. 60/086,278, entitled "FIELD RATIOING DEMODULATION TECHNIQUES FOR A NULL TYPE SERVO PATTERN," filed May 21, 1998, and from a U.S. Application filed on even date herewith and entitled "ASYNCHRONOUS ANALOG DEMODULATOR AND METHOD FOR A NULL TYPE SERVO PATTERN," which claims priority from U.S. Provisional Patent Application 60/086,276, entitled "ASYNCHRONOUS ANALOG DEMODULATION TECHNIQUE FOR A NULL TYPE SERVO PATTERN," filed May 21, 1998 which are assigned to the same assignee.

BACKGROUND OF THE INVENTION

The present invention relates to a servo system in a data storage device and, in particular, to demodulation of position error signals (PES) within the servo system.

A data storage device, such as a magnetic disc drive, stores data on a recording medium The recording medium is typically divided into a plurality of generally parallel data tracks. In a magnetic disc drive, the data tracks are arranged concentrically with one another, perpendicular to the disc radius. The data is stored and retrieved by a transducer or "head" that is positioned over a desired data track by an actuator arm.

The actuator arm moves the head in a radial direction across the data tracks under the control of a closed-loop servo system based on servo data stored on the disc surface within dedicated servo fields. The servo fields can be interleaved with data sectors on the disc surface or on a separate disc surface that is dedicated to storing servo information. As the head passes over the servo fields, it generates a readback servo signal that identifies the location of the head relative to the centerline of the desired track. Based on this location, the servo system rotates the actuator arm to adjust the head's position so that it moves toward a desired position.

There are several types of servo field patterns, such as a "null-type" servo pattern, a "split-burst amplitude" servo pattern, and a "phase type" servo pattern. A null type servo pattern includes at least two fields which are written at a known phase relation to one another. The first field is a "phase" or "sync" field which is used to lock the phase and frequency of the read channel to the phase and frequency of the read signal. The second field is a position error field which is used to identify the location of the head with respect to the track centerline.

As the head passes over the position error field, the amplitude and phase of the read signal indicates the magnitude and direction of the head offset with respect to the track centerline. The position error field has a null-type magnetization pattern such that when the head is directly straddling the track centerline, the amplitude of the readback signal is ideally zero. As the head moves away from the desired track centerline, the amplitude of the read signal increases. When the head is half-way between the desired track centerline and the centerline of the adjacent track, the read signal has a maximum amplitude. The magnetization pattern on one side of the centerline is written 180° out of phase with the magnetization pattern on the other side of the centerline. Thus, the phase of the read signal indicates the direction of the head position error.

To control the servo system, a single position error value is generated for each pass over the position error field. Typically, the magnitude of the position error value indicates the distance of the head from the track centerline, and the sign of the position error value indicates the direction of the head's displacement. The position error values are typically created by demodulating the read signal associated with the position error field. In a synchronous process, the exact phase of the read signal from the position error field is known from the phase field's read signal because the phase field is written on the storage medium at a known and fixed phase relation to the position error field. A phase-locked loop (PLL) is typically used to acquire the phase of the phase field, and this phase information is used for demodulating the position error field.

The read signal is demodulated by generating a demodulating signal, such as a square wave, having the same phase and frequency as a fundamental component of the read signal and then, with analog techniques, multiplying the read signal by the demodulating signal. The product is integrated over a time window that corresponds to the middle cycles of the position error field. The result is a position error value for the head with respect to a desired position on the storage medium within that servo pattern. This process essentially identifies the amplitude and phase of the read signal at a specific frequency point. The sign of the position error value indicates which direction the head is located with respect to the desired location.

Although demodulating the read signal with analog techniques provides a very accurate position error value, this type of demodulation can be difficult to integrate onto the same integrated circuit as a predominately digital data channel. This can increase the overall cost and complexity of a servo system.

The present invention addresses these and other problems, and offers other advantages over the prior art.

SUMMARY OF THE INVENTION

The present invention relates to a synchronous digital demodulator and method which solve the above-mentioned problems.

One aspect of the present invention provides a method for demodulating a read signal formed of a user data waveform and a servo waveform which are generated by a read head as the read head passes over a user data area and a servo area, respectively, on a medium in a storage device. The method includes converting the user data waveform to a series of digital user data values at a user data sample rate and then applying the series of digital user data values to a user data detector circuit. The servo waveform is converted to a series of digital servo values at a servo sample rate, which is independent from the user data sample rate. The series of digital servo values is then demodulated synchronously with the servo waveform to produce a position error value indicative of a position error of the read head relative to a location on the medium.

Another aspect of the present invention provides a disc drive storage device for accessing data on a storage medium. The disc drive includes a read head, a read channel, a servo channel and a servo system. The read head generates a user data waveform and a servo waveform as the read head passes over a user data area and a servo area, respectively, on the storage medium The read channel includes a first analog-to-digital (A/D) converter and a user data detector circuit. The first A/D converter is coupled to the read head and has a user data sample rate. The user data detector circuit is coupled to the first A/D converter. The servo channel includes a second A/D converter and a digital servo demodulator. The second A/D converter is coupled to the read head and has a servo sample rate which is independent from the user data sample rate. The digital servo demodulator is coupled to the second A/D converter and has a position error output that represents a distance and direction that the read head is displaced from a location on the storage medium. The servo system is coupled to the servo channel for positioning the read head over the storage medium based in part on the position error output.

Another aspect of the present invention provides a disc drive storage device for accessing data on a medium. The disc drive storage device includes a servo structure and integrated read and servo channels. The servo structure positions a head over the medium based on a position error for the head relative to the medium. The integrated read channel and servo channel receive a user data signal and a servo signal from the head and generate the position error synchronously to the servo signal.

DETAILED DESCRIPTION OF THE PREFERRED EMBODIMENTS

Figure 1:
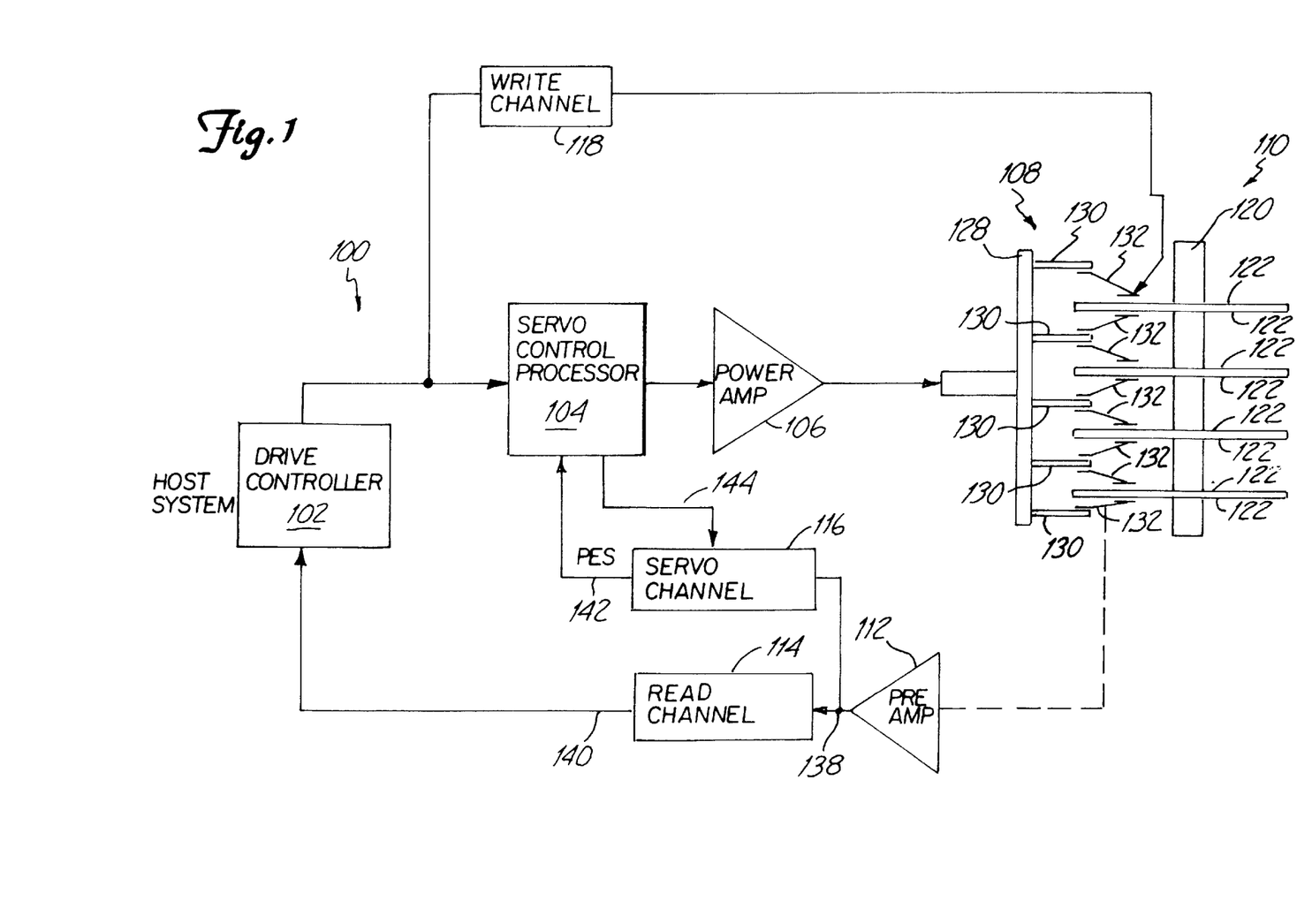
FIG. 1 is a simplified block diagram of a disc drive according to one embodiment of the present invention.

FIG. 1 is a simplified block diagram of a disc drive 100 which includes drive controller 102, servo control processor 104, power amplifier 106, actuator assembly 108, disc pack 110, one or more preamplifiers 112, read channel 114, servo channel 116 and write channel 118. Disc pack 110 includes spindle 120 which supports one or more coaxially arranged discs 122. Although four discs 122 are shown in FIG. 1, disc pack 110 can include any number of discs. Each disc 122 has first and second recording surfaces with concentric data tracks for storing user data in the form of magnetic flux reversals which are encoded in the tracks. Actuator assembly 108 includes a base 128 which supports one or more track accessing arms 130. Each track accessing arm 130 is coupled to at least one suspension 132, which supports a recording head, such as a read and write head, for accessing data on a corresponding disc surface.

Drive controller 102 is typically a microprocessor or digital computer, and is coupled to a host system or another drive controller which controls a plurality of drives. During a write operation, drive controller 102 receives a command signal from the host system which indicates that data is to be written on a certain portion of one or more of discs 122. In response to the command signal, drive controller 102 provides servo control processor 104 with a position request signal which indicates a particular track or cylinder over which actuator assembly 108 is to position suspensions 132 and their associated write heads. Servo control processor 104 converts the position request signal to an analog signal such as a current which is amplified by power amplifier 106 and is provided to actuator assembly 108. In response to the analog position signal, actuator assembly 108 radially positions suspensions 132 and their associated write heads over the desired track.

Drive controller 102 provides the user data that is to be stored to write channel 118. Write channel 118 encodes the data according to a selected encoding scheme and then writes the encoded data in the desired track by controlling the direction of current flowing through the appropriate write head or heads.

During a read operation, drive controller 102 receives a command signal from the host system which indicates that a certain portion of one or more of discs 122 is to be accessed. In response to the command signal, drive controller 102 provides servo control processor 104 with a position request signal which indicates the track to be accessed. Again, servo control processor 104 controls the position of suspensions 132 and their associated read heads through amplifier 106 in response to the position request signal.

As the read head passes over the disc surface within the desired track, the magnetization patterns within the track generate a read signal in the read head which contains the encoded data that was written on the disc surface. The read signal is provided to preamplifier 112 which amplifies the read signal and provides it to read channel 114 and servo channel 116. In an embedded servo scheme, servo sectors are interleaved with user data sectors on the surfaces of discs 122. When a read head passes over a data sector, read channel 114 decodes the encoded data from the read signal to recover the original user data, and then passes the recovered user data to drive controller 102 through data output 140.

When the read head passes over a servo sector, the magnetization patterns within the servo sector generate a plurality of servo bursts in the read signal which provide an indication of the position of the read head within the desired track on the disc surface. Servo channel 116 demodulates the servo bursts to determine the current location of the head and generates a position error signal (PES) estimate on PES output 142, which indicates a magnitude and direction of the position error. Servo control processor 104 monitors the PES and, based on the current location of the head and the desired location received from drive controller 102, servo control processor adjusts the current applied to actuator assembly 108.

Figure 2:
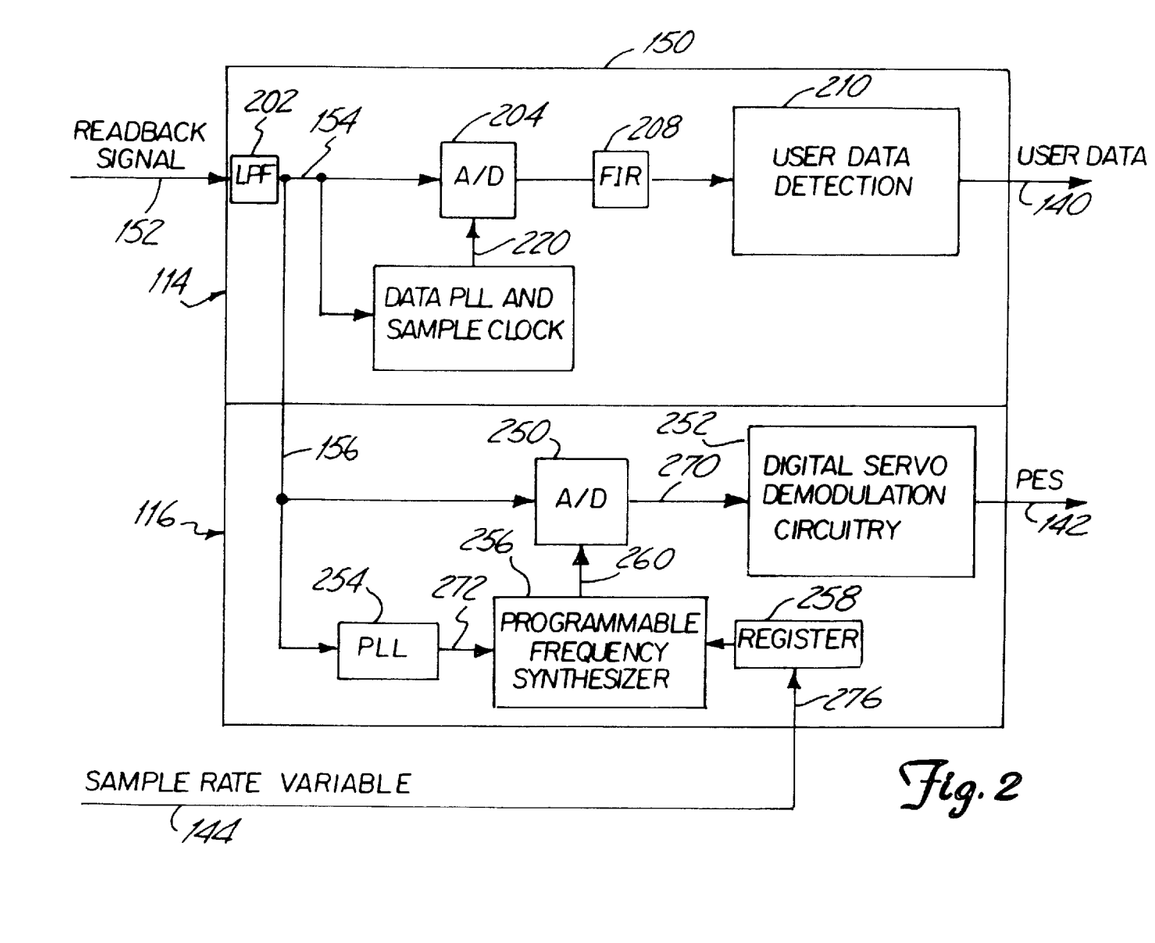
FIG. 2 is a block diagram of a read channel and a servo channel in the disc drive shown in FIG. 1.

As shown in more detail in FIG. 2, servo channel 116 has a synchronous digital demodulator and a programmable analog-to-digital (A/D) sample rate. The sample rate is programmable by servo control processor 104 through sample rate input 144. Servo control processor 104 loads servo channel 116 with a sample rate variable which indicate the desired sample rate. The sample rate variable can be loaded once at start-up or can be updated periodically as desired. In one embodiment, servo control processor 104 runs an optimization routine which selects an optimum sample rate by first varying the sample rate variable and then monitoring the PES estimate produced on PES output 142.

FIG. 2 is a block diagram showing read channel 114 and servo channel 116 in greater detail, according to one embodiment of the present invention. Read channel 114 and servo channel 116 are preferably integrated onto the same integrated circuit 150. Integrated circuit 150 has a read signal input 152 which is coupled to the output of preamplifier 112 (shown in FIG. 1). The read signal from preamplifier 112 is passed through low-pass filter 202 to read signal inputs 154 and 156 of read channel 114 and servo channel 116, respectively.

Read channel 114 includes analog-to-digital (A/D) converter 204, phase-locked loop (PLL) and sample clock circuit 206, finite impulse response (FIR) filter 208 and user data detection circuit 210. Read channel A/D converter 204 samples the filtered read signal and converts the samples to a series of digital values which represent the amplitude of the read signal at each successive sample time. Since the rotational velocity of discs 122 can vary over time and with the radial position of the read head, the PLL in circuit 206 is used to lock onto the phase and frequency of the data transitions in the read signal. The PLL in circuit 206 generates a sample clock signal 220 having a frequency that is selected for accurately and reliably recovering data from the filtered read signal. Sample clock signal 220 is applied to a sample clock input of A/D converter 204. The series of digital values generated by A/D converter 204 are filtered by FIR filter 208 and applied to the input of user data detection circuit 210.

User data detection circuit 210 recovers encoded user data from the series of digital values using a detection method which matches the encoding scheme used by write channel 118 (shown in FIG. 1) to encode the data. For instance, detector 210 may use one of a variety of circuits or methods, such as a Viterbi detector, Decision Feedback Equalization (DFE), Fixed-Delay Tree Search with Decision Feedback (FDTS/DF), Reduced State Sequence detection (RSSE) or Partial Response, Maximum Likelihood (PRML). After detecting and decoding the user data, circuit 208 provides recovered user data to data output 140.

Servo channel 116 includes servo A/D converter 250, digital servo demodulator 252, PLL 254, programmable frequency synthesizer 256 and sample rate variable register 258. Servo A/D converter 250 receives the filtered read signal read input 156 and, when the read head passes over a servo sector on the disc surface, samples the read signal at or above the Nyquist rate and converts the samples to a series of digital servo sample values on A/D output 270. Servo PLL 254 locks on to the phase and frequency of the read signal generated by the servo sector fields on the disc surface and provides a clock output 272 to programmable frequency synthesizer 256. Synthesizer 256 generates a servo sample clock signal 260 by dividing or multiplying the frequency of the clock signal received from PLL 254 by a programmable sample rate variable that is stored in register 258. Register 258 has an input 276 which is coupled to sample rate input 144 for receiving the sample rate variable from servo control processor 104. Servo sample clock signal 260 is applied to A/D converter 250 for controlling the sample rate of the converter. Digital servo demodulator 252 synchronously demodulates the series of digital servo sample values provided by A/D converter 250 to generate the position error estimate on PES output 142, as discussed in more detail with reference to FIG. 7 below.

In the embodiment shown in FIG. 2, read channel 114 and servo channel 116 have separate A/D converters. This allows the number of quantization bits and the sample rate of each converter to be selected independently. The preferred number of quantization bits in read channel 114 typically depends upon the type data encoding and decoding schemes used in the read and write channels. However, for servo channel 116, the greater the number of quantization bits in A/D converter 250, the lower the root mean square error (RMS) in the position error. Also, the preferred sample rates for read channel 114 and servo channel 116 may be different from one another. The burst frequencies generated by a typical servo sector are well below the burst frequencies generated by a typical data sector. The use of separate A/D converters allows independent sample rates and numbers of quantization bits.

Another advantage of the embodiment shown in FIG. 2 is that since demodulator 252 is a digital demodulator, servo channel 116 can be integrated on the same integrated circuit as read channel 114, if desired. A separate analog demodulator circuit is not required. This reduces the cost and improves flexibility in the design of each channel. Although analog demodulation is the limit to which digital demodulation can approach in terms of accuracy of the PES, if the loss of accuracy is small for a reasonable reduction in circuit complexity, then digital demodulation can be an acceptable substitute for analog demodulation.

Figure 3:
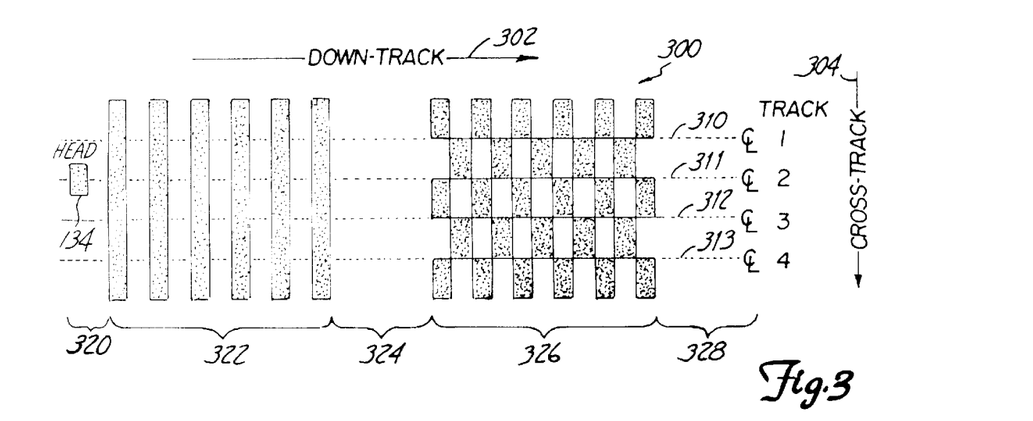
FIG. 3 is a diagram showing the essential portions of a null-type servo magnetization pattern used in one embodiment of the present invention and in the prior art.

FIG. 3 is a diagram showing the essential portions of a null-type servo magnetization pattern in a servo sector 300 on one of the discs 122. This servo pattern is used in one embodiment of the present invention and in the prior art. The radial dimension of disc 122 is shown vertically, and the angular dimension of disc 122 is shown horizontally. Arrow 302 indicates a down-track direction, or angular dimension, of disc 122. Arrow 304 indicates a cross-track direction, or radial dimension, of disc 122. FIG. 3 shows four track centers 310, 311, 312 and 313, which are labeled "1", "2", "3" and "4", respectively. A read head 316 is aligned with track center "2" along cross-track direction 304.

The shaded regions in FIG. 3 correspond to regions of opposite magnetic polarity as compared to the non-shaded regions. For example, in a longitudinal recording system, if the longitudinal magnetization in the non-shaded regions is right-to-left in the figure, then the longitudinal magnetization in the shaded regions would be left-to-right. Within these regions, the magnetic medium is saturated in either longitudinal direction, as is standard practice in digital magnetic recording.

Servo sector 300 includes leading fields 320, "sync" or "phase" field 322, middle fields 324, position error field 326 and trailing fields 328. Leading fields 320, middle fields 324 and trailing fields 328 may be "empty" as shown in FIG. 3 or may include additional servo data. For example, leading fields 320 can include a write recovery field and middle fields 324 can include a track number and a sector number. Phase field 322 contains radially coherent magnetic transitions. As head 316 passes over phase field 322, the magnetization pattern within phase field 322 induces an oscillating signal in the output of head 316. Position error field 326 contains a null-type magnetic pattern. The null-type magnetic pattern in position error field 326 is written in a predetermined phase relation to the magnetic pattern in phase field 322. Position error field 326 can also include a set of quadrature null patterns (not shown) which are offset by one-half of a track width with respect to the original, normal null burst patterns.

A PLL, such as PLL 254 in FIG. 2, is typically used to lock onto the phase and frequency of the oscillating signal induced by phase field 322 and to generate a demodulating or mixing signal having a phase which is synchronized with the phase of the oscillating signal. The demodulating signal is used to demodulate the position error signal from position error field 326. In the prior art, demodulating the read signal involved multiplying the analog read signal by the demodulating signal and integrating the result to produce a position error value. Because the null-type servo pattern is written at the same frequency as the phase field and at a fixed phase relation to the phase field, multiplying the two signals produces either a positively rectified signal or a negatively rectified signal. At the track center, the rectified signal will have zero magnitude because the position error signal is zero at the track center. If head 316 is displaced to one side of the track center, the rectified signal is positive, and if head 316 is displaced to the other side of the track center the rectified signal is negative.

Phase field 322 has also been used for automatic gain control (AGC) in order to maintain the amplitude of the readback signal in the same scale range independent of the radial position of head 316. Automatic gain control is used to normalize the demodulated position error to maintain the same slope (gain) in cross-track direction 304.

Figure 4:
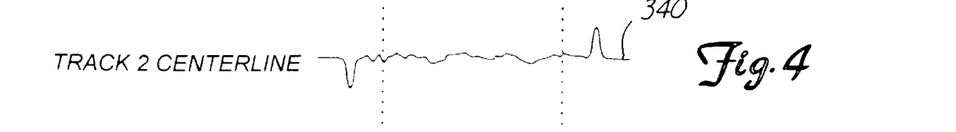
FIG. 4 is a waveform diagram showing a portion of a read signal produced by a head passing over a position error field in the pattern shown in FIG. 3 while directly straddling a track centerline.
Figure 5:
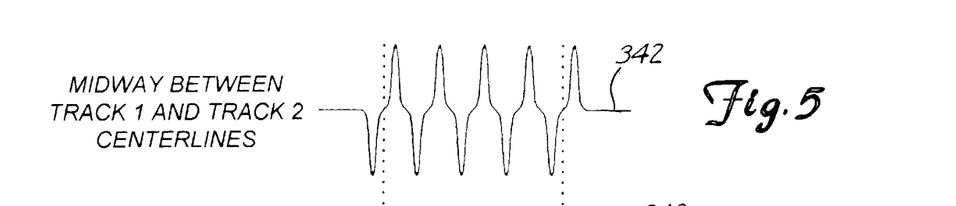
FIG. 5 is a waveform diagram showing a portion of the read signal produced while the head is positioned on one side of the desired track centerline.
Figure 6:
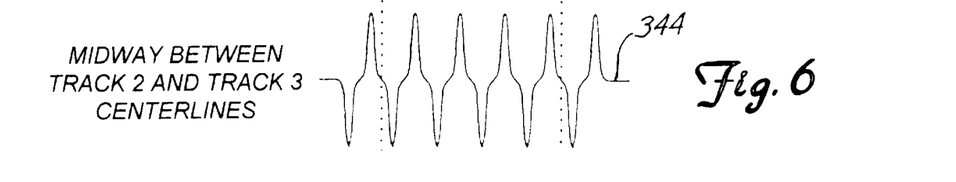
FIG. 6 is a waveform diagram showing a portion of the read signal produced while the head is positioned on the other side of the desired track centerline.

FIG. 4 is a waveform diagram showing a portion of the read signal as head 316 passes over position error field 326 while directly straddling centerline 311 of track 2. The read signal from head 316 is substantially zero. FIG. 5 is a waveform diagram showing a portion of the read signal when head 316 is half-way between centerlines 310 and 311 of tracks 1 and 2, respectively. FIG. 6 is a waveform diagram showing a portion of the read signal when head 316 is half-way between centerlines 311 and 312 of tracks 2 and 3, respectively. The read signal in FIG. 6 is 180° out of phase from the read signal in FIG. 5. It is this phase difference that causes the rectified signal to be positive or negative, depending on which direction head 316 is displaced from the track center.

Figure 7:
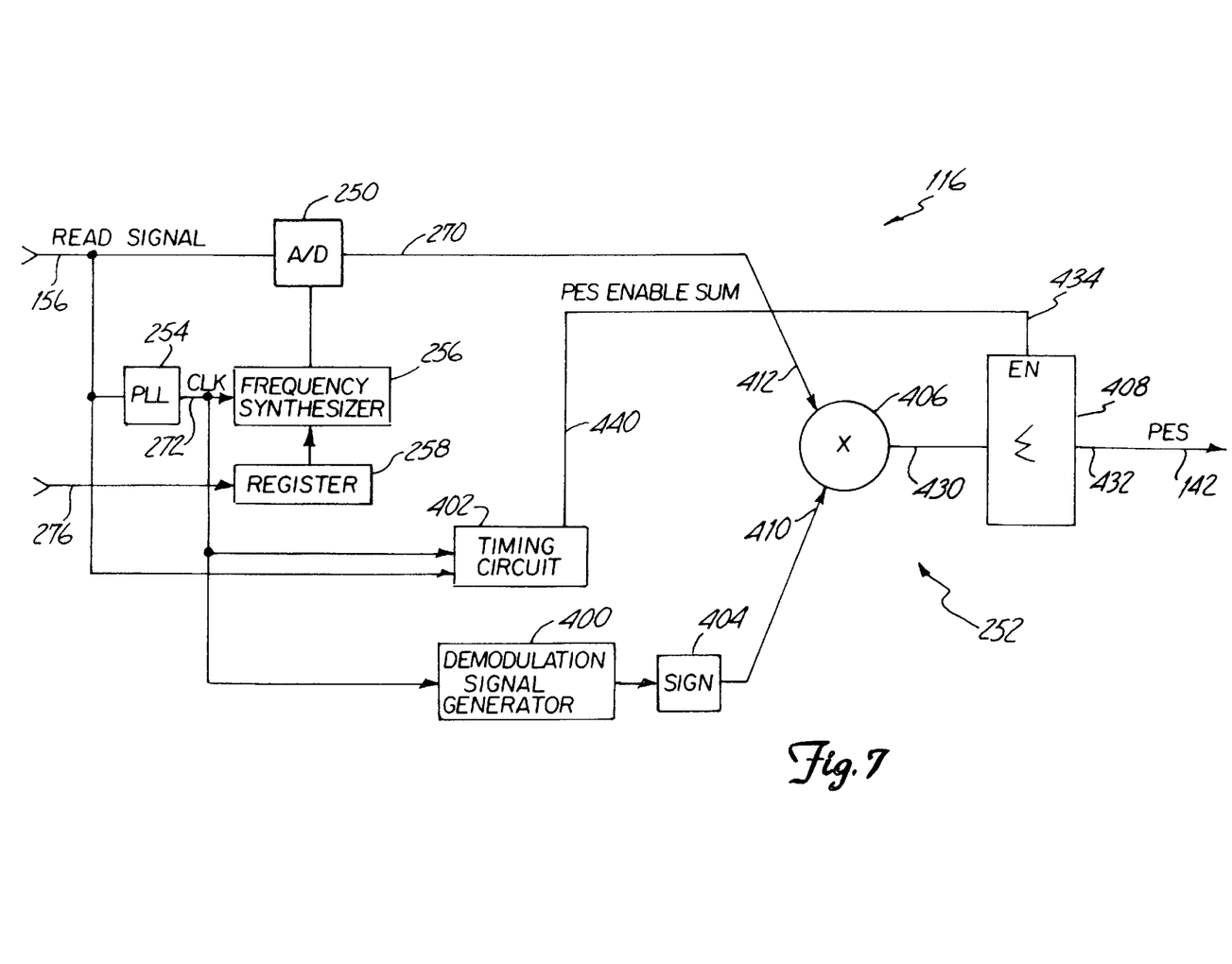
FIG. 7 is a block diagram showing the servo channel of FIG. 2 in greater detail according to one embodiment of the present invention.

FIG. 7 is a block diagram showing servo channel 116 with demodulator 252 in greater detail according to one embodiment of the present invention. Servo demodulator 252 includes demodulation signal generator 400, timing circuit 402, sign circuit 404, multiplier 406, accumulator 408 and PES output 142. The filtered read signal is applied to read input 156, which is coupled to servo A/D converter 250, PLL 254 and timing circuit 402. As explained above, A/D converter 250 samples the filtered read signal at or above the Nyquist rate and converts the samples to a plurality of digital servo values on A/D output 270. The plurality of digital servo values on A/D output 270 are applied to input 412 of multiplier 406.

Demodulation signal generator 400 has an input 414 for receiving the clock signal from output 272 of PLL 414 and responsively generates a square-wave demodulating signal on output 414 which is synchronized with the phase and frequency of the filtered read signal.

Sign circuit 404 is coupled between output 416 of demodulation signal generator 400 and input 410 of multiplier 406. Sign circuit 400 samples the sign of the demodulating signal and generates a series of digital sign values (such as a series of "0's" and "1's") on sign output 420 which are multiplied against the plurality of digital servo samples by multiplier 406. Sign output 420 toggles between "0" and "1" (e.g. "positive" and negative") every half cycle of the demodulating signal. In an alternative embodiment, demodulating signal generator 400 generates a series of signed digital words which are digitally multiplied against corresponding servo sample values by multiplier 406.

A square-wave demodulating signal generator and a sign circuit are fairly simple to implement and provide a high quality position error signal, as described in more detail below. In alternative embodiments, other demodulation signals can be used such as sinusoidal waves (sine and cosine) or a matched filter signal. With these alternative demodulating signals, the digital servo sample values would be multiplied by corresponding sampled values of the demodulation signals.

Multiplier 406 essentially "flips" or "inverts" the signs of the digital servo sample values, possibly with gain, every half clock cycle when the sign of the demodulating signal is negative. When the sign of the demodulating signal is positive, the sign of the digital servo sample value is not inverted. Multiplier output 430 provides a plurality of signed demodulated servo sample values which are applied to the input of accumulator 408.

Accumulator 408 accumulates the signed demodulated servo sample values on output 430 during a selected time window to obtain a scaled PES estimate on output 432. Output 432 is coupled to PES output 142. Accumulator 408 has an enable input 434 which is coupled to PES enable sum output 440 of timing circuit 402. Timing circuit 402 activates PES enable sum output 440 at a predetermined time following detection of a synchronization or servo address mark ("SAM"), for example, in middle fields 324 (shown in FIG. 3). Timing circuit 402 is synchronized with the phase and frequency of the filtered read signal through output 272 of PLL 254. In a preferred embodiment, PES enable sum output 440 enables accumulator 408 during the middle cycles of position error field 326 to accumulate a position error portion of the plurality of servo sample values and thereby generate a position error estimate on accumulator output 432.

The sign of the position error estimate on accumulator output 432 indicates which direction head 316 is in relation to the track centerline. The magnitude of the position error estimate indicates how far head 316 is displaced from the track centerline. The signed position error estimate is used by servo control processor 104 (shown in FIG. 1) to control the radial position of head 316 relative to the desired track centerline on the surface of disc 122.

Mathematically, the position error signal (PES) at some radial position on the disc surface can be written as:

$$PES = \sum_{n=0}^{N-1} r(nT_S) \cdot \delta(t - nT_S) \cdot m_x(f_{SB}, \phi_{SB}, nT_S) \qquad \text{Eq. 1}$$

$$m_x(f_{SB}, \phi_{SB}, nT_S) = \begin{cases} sgn[\sin(2\pi f_{SB} nT_S + \phi_{SB})] \\ \sin(2\pi f_{SB} nT_S + \phi_{SB}) \\ r_{IDEAL}(nT_S) \end{cases} \qquad \text{Eq. 2}$$

where r( ) is the read signal from recording head 316, n is the sample number, $T_s$ is the sampling period, $\delta$( ) is the Dirac delta function (impulse function), sgn[ ] is the signum function, $f_{SB}$ is the servo burst frequency, $r_{IDEAL}$ is the ideal read signal, and $\phi_{SB}$ is the servo burst phase offset necessary to align the fundamental frequency of the demodulating or mixing signal with the fundamental frequency component of the demodulating signal. The signal $m_x$ defined in Equation 2 shows several possible demodulating signals, including a square wave, constant frequency sinusoid, and matched filter signal (equivalent to the ideal read signal). Sampling at the Nyquist rate will properly demodulate the read signal because of the known synchronization between the demodulating signal and the phase of the read signal from position error field 326. At the Nyquist rate, digital servo demodulator 252 essentially samples at the peaks, since the zero crossing samples are zero.

Figure 8:
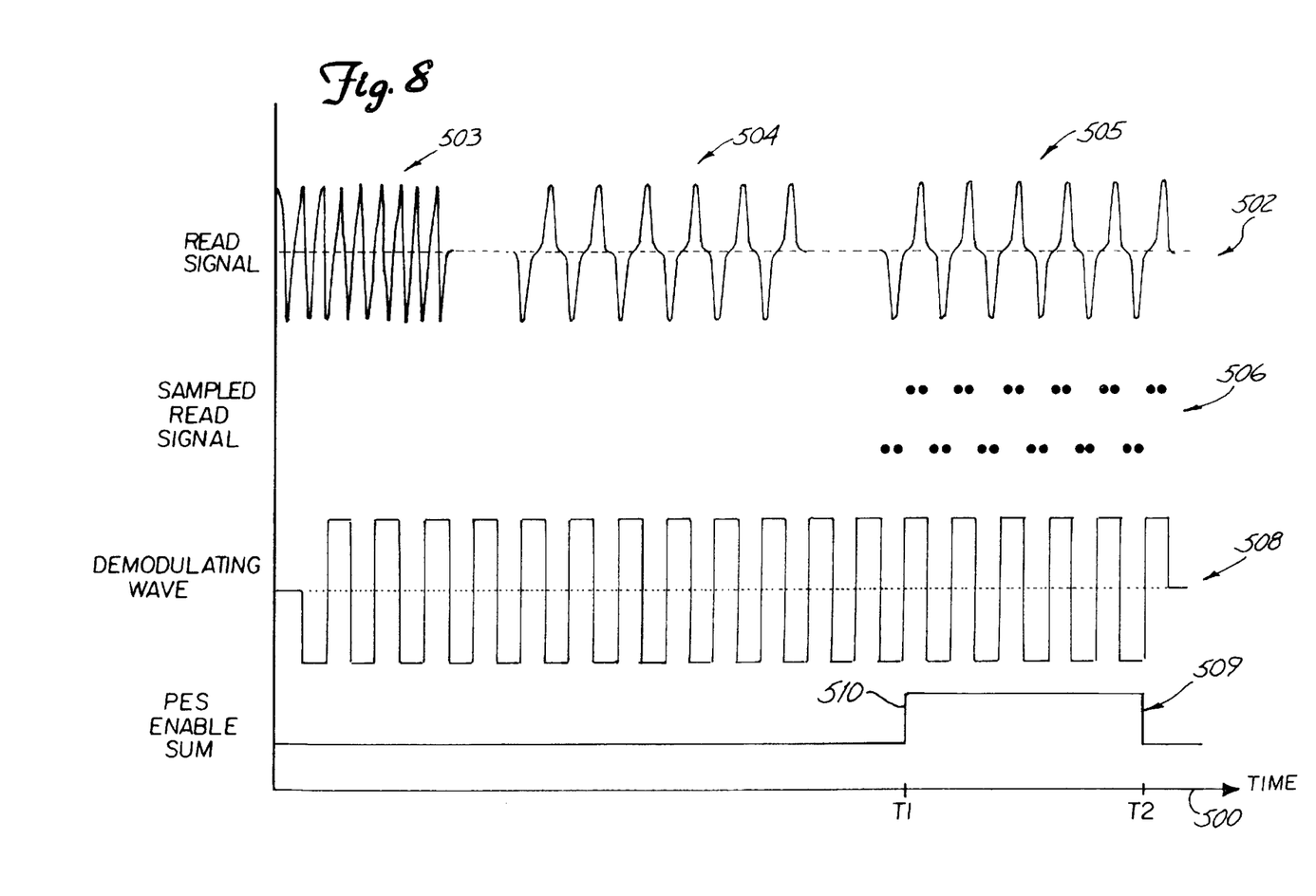
FIG. 8 is a waveform diagram illustrating various waveforms in the demodulator circuit shown in FIG. 7 over time.

FIG. 8 is a waveform diagram illustrating various waveforms in servo channel 116 over a time axis 500. Line 502 represents the read signal received on read input 156. The read signal includes a user data waveform 503 which is generated by the read head as the read head passes over a user data area on the disc surface. The read signal also includes a pair of servo waveforms 504 and 505 which are generated by the read head as the read head passes over a servo area, such as servo sector 300 in FIG. 3, on the disc surface. Servo waveform 504 is generated by phase field 322, and waveform 505 is generated by position error field 326. The plurality of digital servo values generated on A/D output 270 is shown at 506. Each dot represents the magnitude and sign of servo waveform 505 for the corresponding sample. Waveform 508 represents the demodulating square wave generated by demodulation signal generator 400. Waveform 509 represents the PES enable sum signal generated on enable output 440 of timing circuit 402. The PES enable sum waveform goes active at time T1 and inactive at time T2 to define a position error field accumulation time window 510 during which accumulator 408 is enabled for generating a position error field Fourier coefficient.

Figure 9:
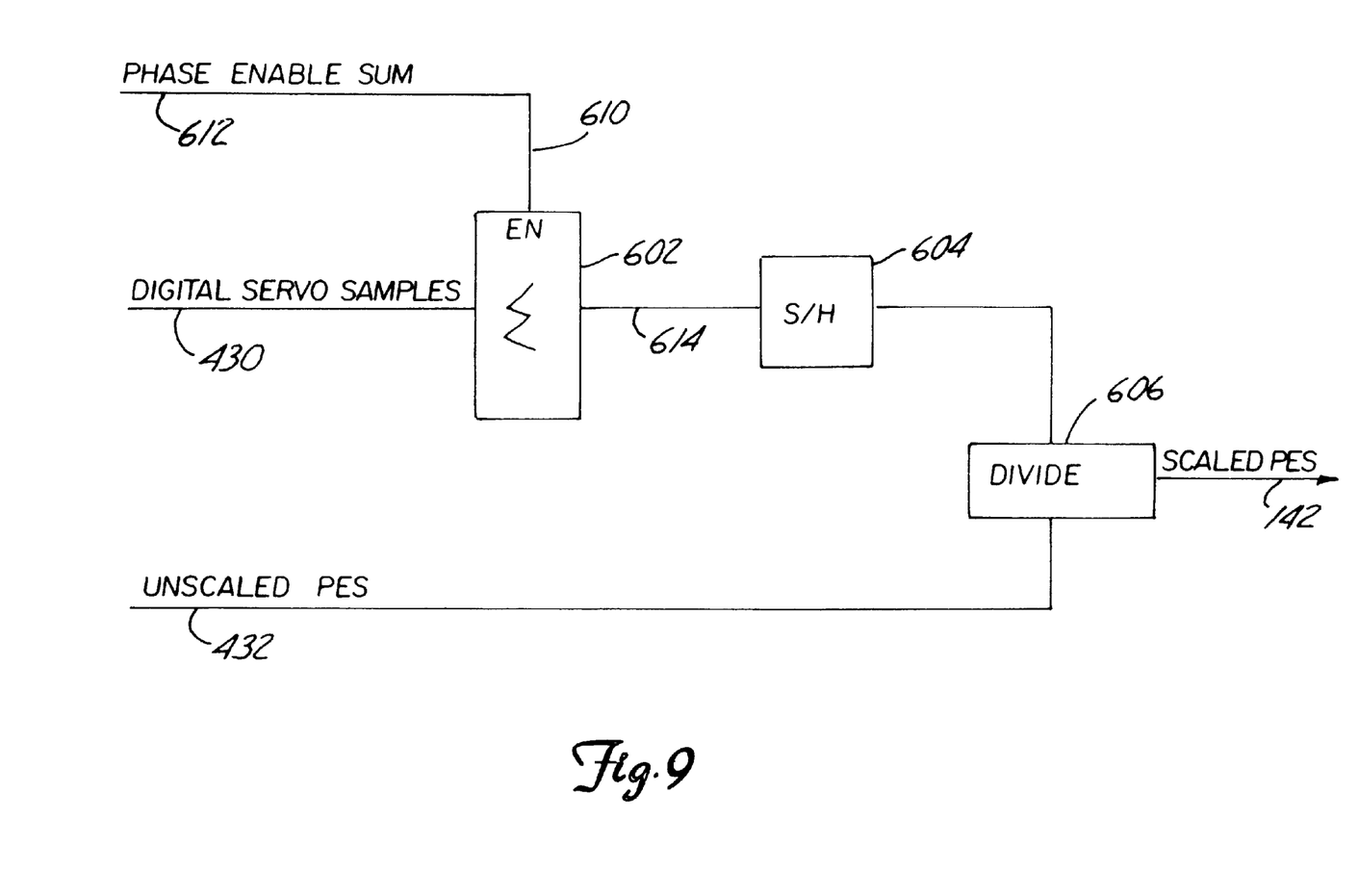
FIG. 9 is a block diagram of a normalization circuit for normalizing the position error magnitude according to an alternative embodiment of the present invention.

In some embodiments, the signed position error estimate produced on accumulator output 432 (shown in FIG. 8) is normalized before being used to control the servo system. A normalization circuit 600 used in these embodiments is shown in FIG. 9. Normalization circuit 600 includes phase field accumulator 602, sample and hold circuit 604 and divide circuit 606. The digital servo sample values generated on output 430 of multiplier 406 (shown in FIG. 7) are applied to the data input of phase field accumulator 602.

Phase field accumulator 602 has an enable input 610 which is coupled to an additional output 612 of timing circuit 402. Timing circuit 402 activates a phase field enable sum signal on output 614 during the middle cycles of phase field 322 (shown in FIG. 3). Phase field accumulator 602 accumulates the digital servo sample values while the phase field enable sum signal is active for generating a reference amplitude on accumulator output 614. The reference amplitude is stored in sample and hold circuit 604 while the unscaled position error value is estimated in PES accumulator 408 (shown in FIG. 7). Sample and hold circuit 604 is used since phase field 322 and PES field 326 occur at different times in the read signal. When the unscaled position error value appears on output 432 of PES accumulator 408, it is divided by the reference amplitude that is stored in sample and hold circuit 604 by divide circuit 608. The output of divide circuit 608 is a normalized position error estimate, which is coupled to PES output 142. The phase field and the PES field do not need to be the same length, as long as the ratio of the number of cycles between the two fields is known and accounted for during normalization. In another alternative embodiment, a highly accurate automatic gain control circuit is used to normalize the PES estimate.

Referring back to FIG. 7, servo A/D converter 250 can sample the filtered read signal at an integer multiple of the fundamental frequency of the servo waveform, as detected by PLL 254, or can sample the filtered read signal at a non-integer multiple sample rate that precesses the sample times through the read signal. In one preferred embodiment, servo A/D converter 250 has a precessing sample rate of greater than five samples per cycle of the read signal, which maximizes a ratio of the PES estimate to noise.

The synchronous demodulator shown in FIGS. 2 and 7 was simulated to determine the effects of the number of quantization bits in servo A/D converter 250 and the sample rate of servo A/D converter 250. One measure of the quality of the signed position error estimate generated by the synchronous demodulator of the present invention is the amount of noise that it will reject. Electronics noise is the simplest case, and is usually taken to be additive white Gaussian noise (AWGN). In the simulations, AWGN was added to the raw read signal, which was then low-pass filtered to help remove some of the effects of the additive noise, and finally demodulated.

Figure 10:
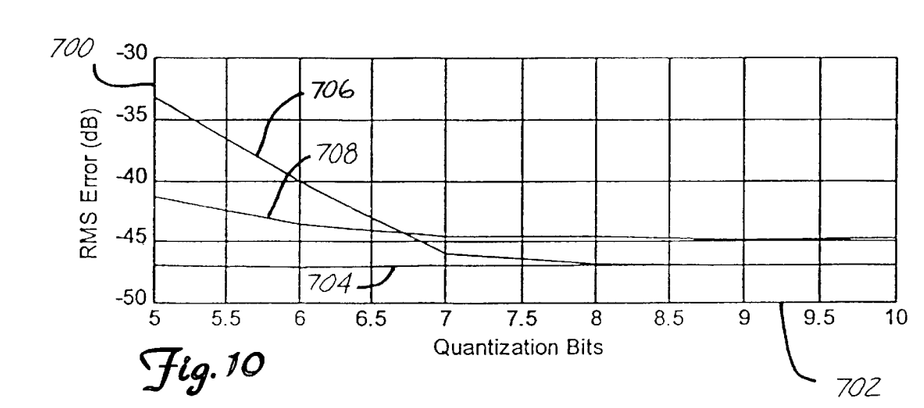
FIG. 10 is a graph showing root mean square (RMS) error of position error magnitude as a function of the number of quantization bits used by an A/D converter in the servo channel shown in FIG. 7.

FIG. 10 is a graph showing root mean square (RMS) error of the position error magnitude on axis 700 as a function of the number of quantization bits, on axis 702, used by servo A/D converter 250 for sampling the read signal. The higher the RMS error, the lower the quality of the PES estimate. A raw signal to noise (SNR) ratio of 20 dB was assumed in the simulations. Here SNR is defined as the ratio of the square of the zero-to-peak voltage of an isolated read pulse to the noise power over the demodulator bandwidth.

Having fewer bits in servo A/D converter 250 is desirable from a speed and cost standpoint. Line 704 shows the RMS error as a function of the number of quantization bits for a synchronous analog demodulation method. Since an analog synchronous demodulation method does not use sampling, it is a good benchmark against which to measure the synchronous digital demodulator of the present invention. The RMS error for the synchronous analog method, shown by line 704, was about −46 dB. Line 706 shows the RMS error as a function of the number of quantization bits for the synchronous digital demodulator in which servo A/D converter 250 samples the read signal at an integer multiple of the read signal frequency (e.g. four samples per cycle). Line 708 shows the RMS error as a function of the number of quantization bits for the synchronous digital demodulator in which servo A/D converter 250 samples the read signal at a non-integer multiple, precessing sample rate of at least five samples per cycle. The precessing sampling method outperforms the non-precessing sampling method for lower numbers of quantization bits. For example with five quantization bits the precessing sampling method outperforms the non-precessing sampling method by 9 dB. The reason for this performance gain is that the sample precession acts like a kind of dithering input to servo A/D converter 250 to help mitigate quantization errors.

FIG. 10 shows that there is a tradeoff between sample rate and quantization bits, since more samples per cycle are required for the precessing sampling method than the non-precessing sampling method. FIG. 10 also shows that selection of the number of quantization bits can be critical to obtaining a good quality PES estimate. A typical Partial Response Maximum Likelihood read channel has six quantization bits. If the user data A/D converter output were used to digitize servo data in addition to user data, this number of quantization bits would result in the PES estimate having a relatively large RMS error. Use of independent A/D converters for digitizing user data and servo data therefore allows for the number of quantization bits to be optimized for each channel.

Figure 11:
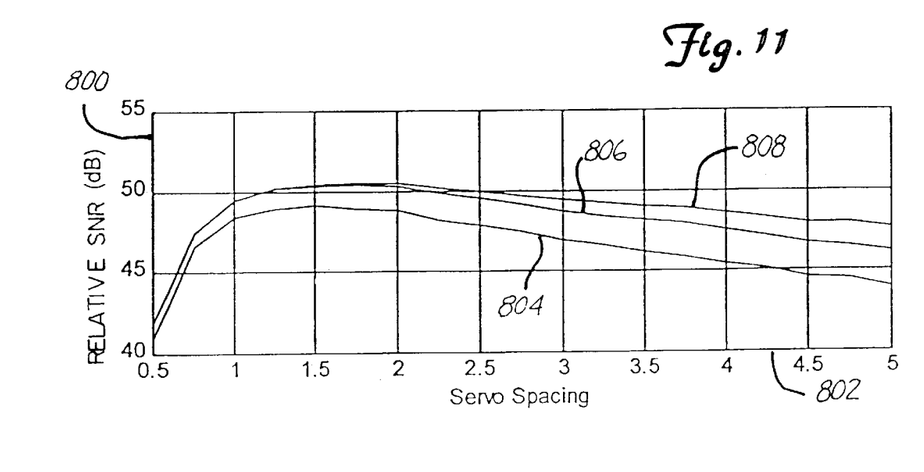
FIG. 11 is a graph illustrating signal-to-noise ratio (SNR) of position error magnitude for various demodulating signals as a function of the servo burst frequency, defined in terms of pulse-to-pulse spacing.

As mentioned above, the A/D sampling rate for the servo channel is preferably independent of the A/D sampling rate for the read channel. The optimal frequency of the servo bursts from a servo sector is usually much lower than the optimal frequency of data bursts from a data sector. FIG. 11 is a graph showing SNR of the position error magnitude on axis 800 as a function of servo spacing (SSP) on axis 802. Servo spacing is defined as:

$$SSP = \frac{\left(\frac{T_{SB}}{2}\right)}{pw50} \qquad \text{Eq. 3}$$

where pw50 is the pulse width at half the maximum amplitude of the recording head's isolated transition step response. Line 804 represents the SNR as a function of servo spacing with a matched filter demodulating signal. Line 806 represents the SNR as a function of servo spacing with a sinusoid demodulating signal. Line 806 represents the SNR as a function of servo spacing with a square wave demodulating signal. FIG. 11 shows that SNR versus SSP for each of these demodulating signals peaks between SSP values of 1.5 and 2.0. For example, if an SSP of 20 is optimal from SNR and other considerations, the servo burst frequency, $f_{SB}=1/T_{SB}$, with a pw50 of 10 nanoseconds is 25 MHz. This servo burst frequency is well below the frequencies normally seen in user data read channels. The use of independent sample rates allows the user data channel and the servo channel to be optimized independently.

Separate read channel and servo channel A/D converters are not required. In one embodiment, the read channel and the servo channel share the same A/D converter, but operate the A/D converter with different, gated sample clock signals. A first, data sample clock signal is applied to the A/D converter when the head passes over a data sector, and a second, servo sample clock signal is applied to the A/D converter when the head passes over a servo sector. However, separate A/D converters may be desired so that the number of bits and the speed of each A/D converter can be optimized separately. Other configurations are also possible. For example, the data and servo PLLs and the frequency synthesizer can be combined and re-programmed through register 258 between the data and servo sectors.

In summary, one aspect of the present invention relates to a method for demodulating a read signal formed of a user data waveform 503 and a servo waveform 504, 505 which are generated by a read head 316 as the read head 316 passes over a user data area and a servo area, respectively, on a medium 122 in a storage device 100. The method includes steps of: (a) converting the user data waveform 503 to a series of digital user data values at a user data sample rate; (b) applying the series of digital user data values to a user data detector circuit 210; (c) converting the servo waveform 505 to a series of digital servo values 506 at a servo sample rate, which is independent from the user data sample rate; and (d) demodulating the series of digital servo values 506 synchronously with the servo waveform 504, 505 to produce a position error value 142 indicative of a position error of the read head 316 relative to a location on the medium 122.

In one embodiment, the servo sample rate is an integer multiple of a fundamental frequency of the servo waveform 504, 505. In another embodiment, the servo sample rate in is a non-integer multiple of a fundamental frequency of the servo waveform 504, 505, such as greater than five samples per cycle of the servo waveform 504, 505.

A first phase-locked loop 206 generates a user data clock signal as a function of the user data waveform 503, and a first sample clock signal 220 is generated based on the user data clock signal. The first sample clock signal 220 is applied to the first A/D converter 204 to operate the first A/D converter 204 at the user data sample rate. A second phase-locked loop 254 generates a servo clock signal 272 as a function of the servo waveform 504, and a second sample clock signal 260 is generated based on the servo clock signal 272. The second sample clock signal 260 is applied to the second A/D converter 250 to operate the second A/D converter 250 at the servo sample rate. In one embodiment, a sample rate variable is stored in a programmable register 258, and the servo clock signal 272 is modified by the sample rate variable that is stored in the programmable register 258 to generate the servo sample clock signal 260.

The servo waveform 505 is demodulated by generating a demodulating signal 508 from the servo clock signal 272, wherein the demodulating signal 508 is synchronized with a fundamental phase and frequency of the servo waveform 504. The series of digital servo values 506 are multiplied by the demodulating signal 508 to produce a plurality of demodulated servo values. The plurality of demodulated servo values are accumulated to produce the position error value 142.

Another aspect of the present invention provides a disc drive storage device 100 for accessing data on a storage medium 122. The disc drive 100 includes a read head 316, a read channel 114, a servo channel 116 and a servo system 104, 106, 108. The read head 316 generates a user data waveform 503 and a servo waveform 505 as the read head 316 passes over a user data area and a servo area, respectively, on the storage medium 122. The read channel 114 includes a first analog-to-digital (A/D) converter 204 and a user data detector circuit 210. The first A/D converter 204 is coupled to the read head 316 and has a user data sample rate. The user data detector circuit 210 is coupled to the first A/D converter 204. The servo channel 116 includes a second A/D converter 250 and a digital servo demodulator 252. The second A/D converter 250 is coupled to the read head 316 and has a servo sample rate which is independent from the user data sample rate. The digital servo demodulator 252 is coupled to the second A/D converter 250 and has a position error output 142 that represents a distance and direction that the read head 316 is displaced from a location on the storage medium 122. The servo system 104, 106 and 108 is coupled to the servo channel 116 for positioning the read head 316 over the storage medium 122 based in part on the position error output 142.

Another aspect of the present invention provides a disc drive storage device 100 for accessing data on a medium 122. The disc drive storage device 100 includes a servo structure 104, 106, 108 and integrated read and servo channels 114, 116. The servo structure 104, 106, 108 positions a head 316 over the medium 122 based on a position error for the head 316 relative to the medium 122. The integrated read channel 114 and servo channel 116 receive a user data signal 503 and a servo signal 504, 505 from the head 316 and generate the position error synchronously to the servo signal 504, 505.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A method for demodulating a read signal formed of a user data waveform and a servo waveform which are generated by a read head as the read head passes over a user data area and a servo area, respectively, on a medium in a storage device, the method comprising steps of:

(a) converting the user data waveform to a series of digital user data values at a user data sample rate;

(b) applying the series of digital user data values to a user data detector circuit;

(c) converting the servo waveform to a series of digital servo values at a servo sample rate, which is independent from the user data sample rate, with a first analog-to-digital (A/D) converter having a sample clock input;

(d) generating a servo clock signal as a function of the servo waveform with a first phase-locked loop;

(e) generating a servo sample clock signal as a function of the servo clock signal and applying the servo sample clock signal to the sample clock input of the first A/D converter to operate the first A/D converter at the servo sample rate; and (f) demodulating the series of digital servo values synchronously with the servo waveform by:

(i) generating a demodulating signal from the servo clock signal, wherein the demodulating signal is synchronized with a fundamental phase and frequency of the servo waveform;

(ii) multiplying the series of digital servo values by the demodulating signal to produce a plurality of demodulated servo values; and (iii) accumulating the plurality of demodulated servo values to produce a position error value indicative of a position error of the read head relative to a location on the medium.

2. The method of claim 1 wherein the servo sample rate in the converting step (c) is an integer multiple of a fundamental frequency of the servo waveform.

3. The method of claim 1 wherein the servo sample rate in the converting step (c) is a non-integer multiple of a fundamental frequency of the servo waveform.

4. The method of claim 3 wherein the servo sample rate in the converting step (c) is greater than five samples per cycle of the servo waveform.

5. The method of claim 1 wherein:
   the converting step (a) comprises converting the user data waveform to a series of digital user data values with a second analog-to-digital (A/D) converter.

6. The method of claim 5 and further comprising:
   (g) generating a user data clock signal as a function of the user data waveform with a second phase-locked loop;
   (h) generating a user data sample clock signal based on the user data clock signal; and
   (i) applying the user data sample clock signal to the second A/D converter to operate the second A/D converter at the user data sample rate.

7. The method of claim 1 wherein the generating step (e) further comprises:
   (e) (i) storing a sample rate variable in a programmable register; and
   (e) (ii) modifying the servo clock signal by the sample rate variable that is stored in the programmable register to generate the servo sample clock signal.

8. The method of claim 1 wherein the generating step (f) (i) comprises generating a demodulating signal comprising a series of digital sign values.

9. The method of claim 1 and further comprising:
   (g) generating a user data sample clock signal as a function of the user data waveform;
   wherein the converting step (a) comprises:
      (a) (i) converting the user data waveform to a series of digital user data values with the first analog-to-digital (A/D) converter;
      (a) (ii) applying the user data sample clock signal to the sample clock input of the first A/D converter to operate the first A/D converter at the user data sample rate during the converting step (a) (i); and
   wherein the generating step (e) comprises:
      (e) (i) applying the servo sample clock signal to the sample clock input to operate the A/D converter at the servo sample rate during the converting step (c).

10. A disc drive storage device for accessing data on a storage medium, the disc drive comprising:
   a read head for generating a user data waveform and a servo waveform as the read head passes over a user data area and a servo area, respectively on the storage medium;
   a read channel comprising:
      a first analog-to-digital (A/D) converter which is coupled to the read head and has a user data sample rate; and
      a user data detector circuit which is coupled to the first A/D converter;
   a servo channel comprising:
      a second A/D converter which is coupled to the read head and has a servo sample rate which is independent from the user data sample rate; and
      a digital servo demodulator which is coupled to the second A/D converter and has a position error output that represents a distance and direction that the read head is displaced from a location on the storage medium, wherein the digital servo demodulator comprises:
         a multiplier having a first input coupled to the second A/D converter;
         a demodulation signal generator which generates a demodulating signal that is synchronized with a fundamental phase and frequency of the servo waveform and is coupled to a second input of the multiplier; and an accumulator having an accumulator input coupled to an output of the multiplier and having an accumulator output coupled to the position error output; and a servo system coupled to the servo channel for positioning the read head over the storage medium based in part on the position error output.

11. The disc drive of claim 10, wherein the servo sample rate is an integer multiple of the fundamental frequency of the servo waveform.

12. The disc drive of claim 10 wherein the servo sample rate is a non-integer multiple of the fundamental frequency of the servo waveform.

13. The disc drive of claim 12 wherein the servo sample rate is greater than five samples per cycle of the servo waveform.

14. The disc drive of claim 10 wherein the servo channel further comprises:

a phase-locked loop (PLL) which is coupled to the read head and has a servo clock output;

a register for storing a sample clock variable; and a programmable frequency synthesizer coupled to the servo clock output and the register for modifying the servo clock output by the sample clock variable to produce a sample clock signal on a sample clock output, wherein the sample clock output is coupled to a sample clock input of the second A/D converter.

15. The disc drive of claim 10 wherein the read channel and the servo channel are integrated on a single integrated circuit.

16. A disc drive storage device for accessing data on a medium, the disc drive comprising:

a servo structure for positioning a head over the medium based on a position error for the head relative to the medium; and integrated read channel and servo channel means for digitizing a user data signal and a servo signal received from the head at independent sample rates to produce a digitized user data signal and a digitized servo signal, generating a demodulating signal which is synchronized with a fundamental phase and frequency of the servo signal, multiplying the digitized servo signal by the demodulating signal to produce a plurality of demodulated servo values, and accumulating the plurality of demodulated servo values to produce a position error value indicative of the position error.

17. A disc drive storage device for accessing data on a storage medium, the disc drive comprising:

a read head for generating a user data waveform and a servo waveform as the read head passes over a user data area and a servo area, respectively on the storage medium;

a read channel comprising:

a first analog-to-digital (A/D) converter which is coupled to the read head and has a user data sample rate; and a user data detector circuit which is coupled to the first A/D converter;

a servo channel comprising:

a second A/D converter which is coupled to the read head and has a servo sample rate which is independent from the user data sample rate;

a digital servo demodulator which is coupled to the second A/D converter and has a position error output that represents a distance and direction that the read head is displaced from a location on the storage medium;

a phase-locked loop (PLL) which is coupled to the read head and has a servo clock output;

a register for storing a sample clock variable; and a programmable frequency synthesizer coupled to the servo clock output and the register for modifying the servo clock output by the sample clock variable to produce a sample clock signal on a sample clock output, wherein the sample clock output is coupled to a sample clock input of the second A/D converter; and a servo system coupled to the servo channel for positioning the read head over the storage medium based in part on the position error output.

* * * * *